United States Patent [19]

Allard et al.

[11] Patent Number: 5,120,767
[45] Date of Patent: Jun. 9, 1992

[54] PROCESS AND APPARATUS FOR RECLAIMING THE ECONOMIC COMPONENTS OF SCRAP RUBBER TIRES

[75] Inventors: Ange-Albert Allard, Drummondville; Rosaire Croteau, St. Denis de Brompton, both of Canada

[73] Assignee: Caoutech Inc., St-Elie, Canada

[21] Appl. No.: 526,045

[22] Filed: May 21, 1990

[51] Int. Cl.$^5$ ............................................. B29B 17/02
[52] U.S. Cl. ............................ 521/40.5; 521/41; 521/45.5; 209/2; 209/38
[58] Field of Search ........................ 521/40.5, 41, 45.5

[56] References Cited

U.S. PATENT DOCUMENTS

| | | | |
|---|---|---|---|
| 1,401,795 | 12/1921 | Kohler et al. | 241/74 |
| 2,471,043 | 6/1945 | Schenk | 521/45.5 |
| 2,487,666 | 9/1946 | Navone | 521/45.5 |
| 4,025,990 | 5/1977 | Lovette, Jr. | 241/74 |
| 4,090,670 | 5/1978 | Bennett | 241/23 |
| 4,113,186 | 9/1978 | Smith | 241/24 |
| 4,240,587 | 12/1980 | Letsch | 241/23 |
| 4,342,647 | 8/1982 | McMillan et al. | 241/23 |

FOREIGN PATENT DOCUMENTS

| | | | |
|---|---|---|---|
| 535463 | 1/1957 | Canada. | |
| 2302120 | 8/1974 | Denmark | 521/45.5 |
| 927966 | 4/1955 | Fed. Rep. of Germany. | |

*Primary Examiner*—Paul R. Michl
*Assistant Examiner*—Andrew E. C. Merriam
*Attorney, Agent, or Firm*—Wolf, Greenfield & Sacks

[57] ABSTRACT

A method and an apparatus for separating out the economic components of scrap rubber tires, wherein the rubber tires are passed through a first shredder, a rotary screen, and a magnetic separator. The non-magnetic fraction is then passed through successive second and third rotary screens for separating out fine sand and debris and then for separating out fine particles of rubber and fabric fiber. The fine charge and the coarse charge are directed to respective defibrators which include a rotor in the form of a blade cage through which an airstream is passed carrying rubber particles and fabric fibers. The gate deflects the rubber particles which are then discharged in the the bottom of the defibrator while the lighter fabric fibers pass through the gate in the airstream and are separated out in a cyclone. The coarse rubber particles when discharged from its respective defibrator are recirculated through a second shredder and back to the third rotary screen.

6 Claims, 3 Drawing Sheets

PROCESS AND APPARATUS FOR RECLAIMING THE ECONOMIC COMPONENTS OF SCRAP RUBBER TIRES

BACKGROUND OF THE INVENTION

1. Field of the Invention

The present invention relates to recycling scrap rubber, and more particularly, to a process and apparatus for reclaiming the reusable components such as rubber, textile fibers, and metal from scrap rubber tires.

2. Description of the Prior Art

Most prior art techniques which utilize mechanical comminution of scrap rubber tires require a cryogenic treatment of the scrap before it is to be crushed or ground One of the properties of rubber is its resilience and thus the difficulty in comminuting scrap rubber tires to smaller components.

By treating the scrap by means of cryogenic gases or liquids in order to freeze the scrap, the rubber becomes brittle, allowing the scrap to be handled by conventional crushing, separating, and classifying means. Such methods are described in U.S. Pat. No. 4,025,990, issued May 31, 1977 to Lovette, Jr.; U.S. Pat. No. 4,240,587, issued Dec. 23, 1980 to Letsch; and U.S. Pat. No. 4,342,647, issued Aug. 3, 1982 to McMillan et al.

Such systems are inherently expensive since not only must the scrap tires be rid of water and ice, but all of the scrap must be frozen by cryogenic means.

At least one patent, namely, U.S. Pat. No. 4,113,186, issued Sep. 12, 1978 to Smith, attempts to mechanically separate scrap rubber tires into its major components of rubber, metal bead, and cord fabric. However, the method as disclosed in Smith, U.S. Pat. No. 4,113,186, fails to describe how the rubber component, given its inherent resilience, is efficiently handled in a hammer mill or on vibrating separating screens.

SUMMARY OF THE INVENTION

It is an aim of the present invention to provide an improved mechanical separation of the components of scrap rubber tires into commercially usable materials. For instance, the rubber component is to be reduced to a rubber particulate which can be recycled into rubber floor mats and other similar products. The metal wire can be melted down to be formed into low grade metal products while the fibers from the textile cord, either natural or synthetic, can be utilized as filler material or in any product where a low grade fiber might be required.

It is a further aim to provide a low cost method for recuperating such scrap tire components in an economically feasible manner while eliminating an otherwise potentially serious environmental hazard. Scrap tires are normally stored in large piles and are not naturally degradable. If such piles catch fire, the result is a serious air and water-table pollution problem.

It is a further aim of the present invention to provide a method of mechanical separation of the economic components of scrap rubber tires while reducing the air pollution normally present in such methods in view of the fine fibers resulting from the attempts to segregate the textile fibers.

It is a further aim of the present invention to provide an improved apparatus for separating the economic components of scrap rubber tires.

A method in accordance with the present invention consists of the steps of comminuting the rubber tires in a first stage and screening the reduced portions of rubber, metal, and fabric cord through a first screening stage, and magnetically separating the screened particles between a magnetic fraction and a fraction of substantially rubber and fabric fibers. The rubber and fabric fraction is then conveyed to a second screening stage having a fine mesh for separating fine particles of debris and then to a third screening stage having a larger mesh suitable for separating rubber and fabric fines from the fraction. The rubber and fabric fines which pass through the third screening stage are subjected to a first pneumatic separation stage wherein the lighter fabric particles will be airborne on an airstream which passes through a gate of moving blades while the heavier rubber fines will be prevented from being carried on the airstream by the gate. The heavier rubber fines are then discharged from the pneumatic separator stage. The airborne fibers are conveyed to a cyclone and filter stage where the fibers can be separated from the airstream. The coarse rubber and fabric particles which do not pass through the third screen are conveyed to a second pneumatic separator stage which contains an airstream passing through a gate made up of moving blades which allows the lighter coarse fabric particles to pass through the gate and the heavier coarse rubber and fabric particles to be separated by the gate whereby the latter particles will be discharged to a second comminuting stage. The discharge from the second comminuting stage is then conveyed to the third screening stage for further separation. The fine rubber particles can be stored for use in low grade rubber products, such as floor mats, etc. The magnetic metal pieces can be melted down in a foundry and converted into low and medium grade metal products, while the separated fabric fibers can be used in any product where fabric fibers are required but the quality and class of fiber are not of importance.

In a more specific embodiment of the present invention, the process includes, in addition to the steps mentioned herein, a step wherein the reduced portions of rubber metal and fabric cord which do not pass through the first screening stage are redirected to the first comminuting stage, after passing through a magnetic separation stage for separating larger magnetic metallic portions from this coarse stream. In addition, the fine rubber particles discharged from the first pneumatic separator stage are subjected to a further magnetic separation step.

In a more specific embodiment of the present invention, the non-metallic fraction of rubber and fabric cord particles issuing from the magnetic separation stage following the first screening stage is pneumatically conveyed to the second screening stage, and the discharge from the second comminuting stage is pneumatically conveyed to the third screening stage.

In a still more specific embodiment of the present invention, the steps of comminuting tires in a first comminuting stage and the reducing of the particles of rubber and fabric in the second comminuting stage are carried out by shredding.

In another aspect of the present invention, there is included an apparatus for reducing and separating the economic components of scrap rubber tires, including means for shredding the rubber tires and means for conveying the shredded rubber tires to a rotary screen means for separating smaller particles of rubber, metal bead, and fabric cord. Means are provided for separating the screened particles from the first rotary screen between a magnetic fraction and a non-magnetic fraction containing rubber particles and fabric fibers. Means are provided for segregating the magnetic metal scrap, and conveying means for conveying the rubber particles and fabric fibers to a second rotary screen, whereby sand and other fine debris can be separated from the charge. Means are included for advancing the charge to a third rotary screen means for separating fine particles of rubber and fabric fibers from the coarse particles of rubber and fabric fiber. Means are also provided for passing the screened fines from the third rotary screen to a defibrator means wherein the defibrator means includes a closed housing having an air inlet and an air outlet, means for creating an airstream from the inlet to the outlet, and gate means surrounding the outlet including a rotary member with a plurality of blades intercepting the airstream such that airborne fibers will pass through the gate means to the outlet and rubber particles will be deflected from the airstream. Discharge means are associated with the defibrator means for discharging fine rubber particles therefrom, and means for storing the commercial grade fine rubber particles discharged therefrom. A second defibrator may be utilized for the coarse rubber and fabric fiber discharged from the third rotary screen. The second defibrator means has a similar construction to the first defibrator means, and the discharge of the rubber particles from the second defibrator means is conveyed to a second shredding means for reducing the particles thereof, and conveying means for conveying the discharge from the second shredding means to the third rotary screen. The fabric fibers discharged by the airstream through the outlets of the first and second defibrator means are conducted to a cyclone separating the fibers from the airstream, and the air discharged from the cyclone is filtered for removing fine fabric dust from the airstream.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

Figure 1A:
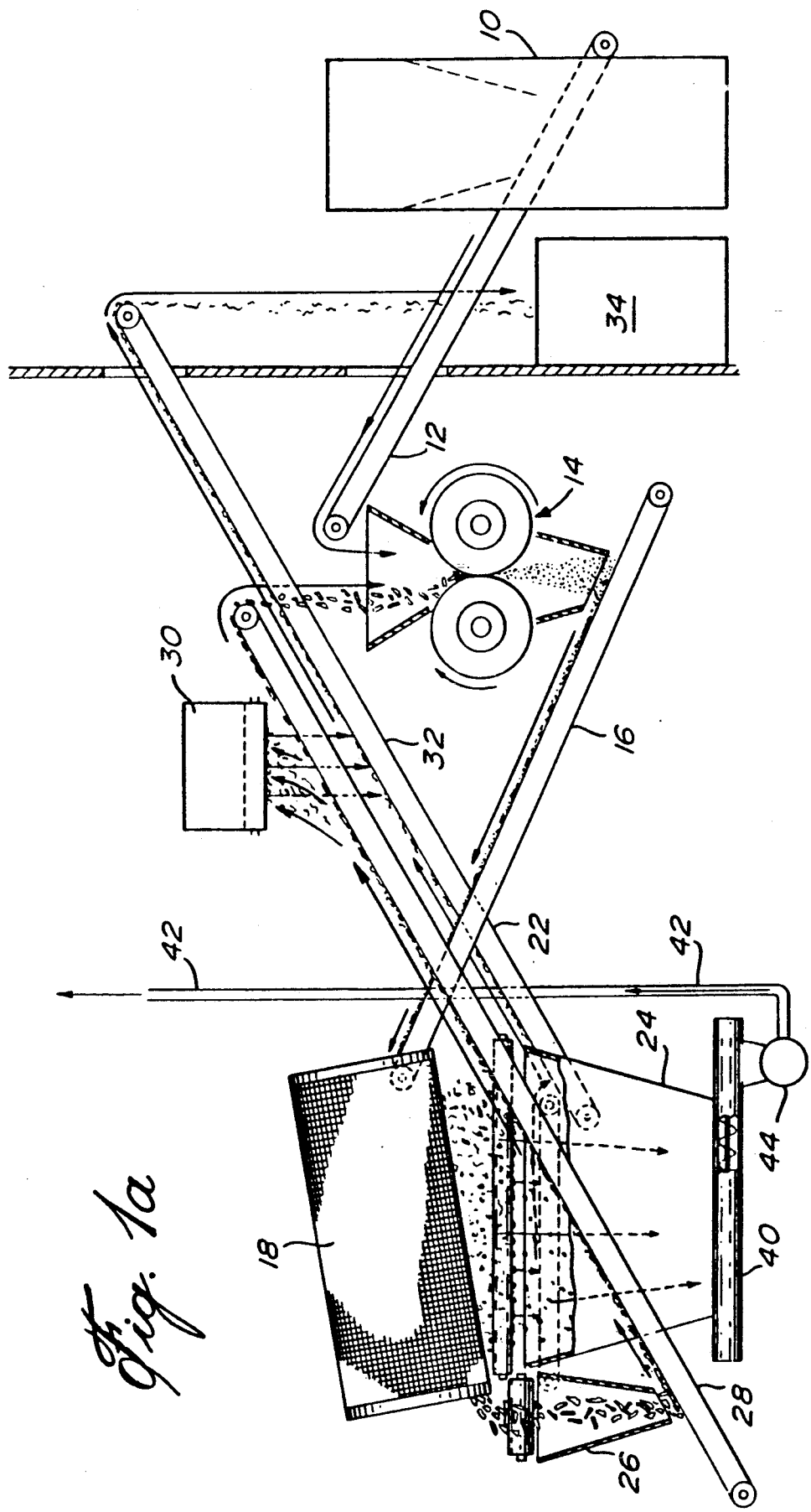
FIGS. 1a and 1b are schematic illustrations of the apparatus in accordance with the present invention for conducting the process in accordance with the present invention.
Figure 1B:
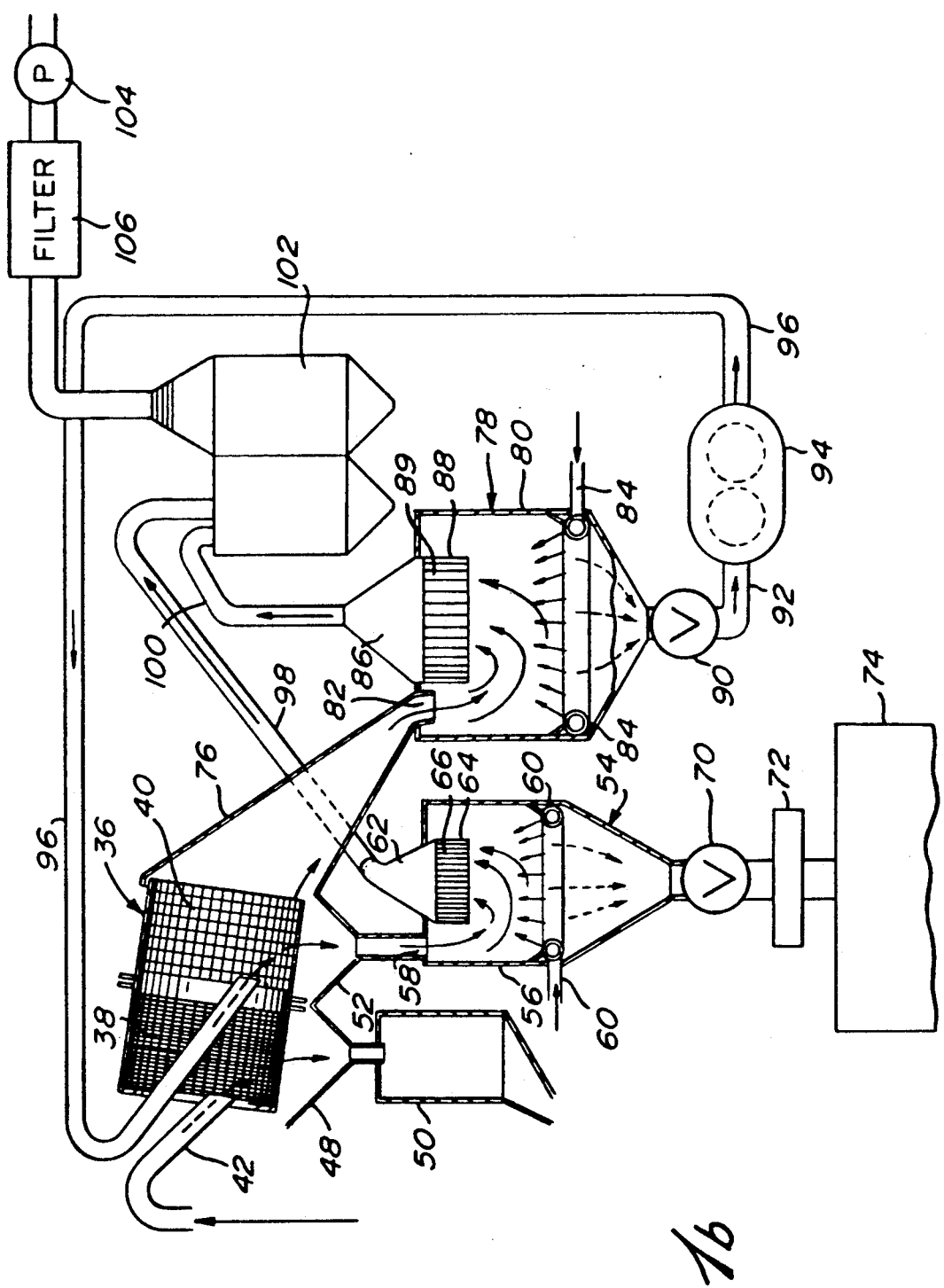
Figure 2:
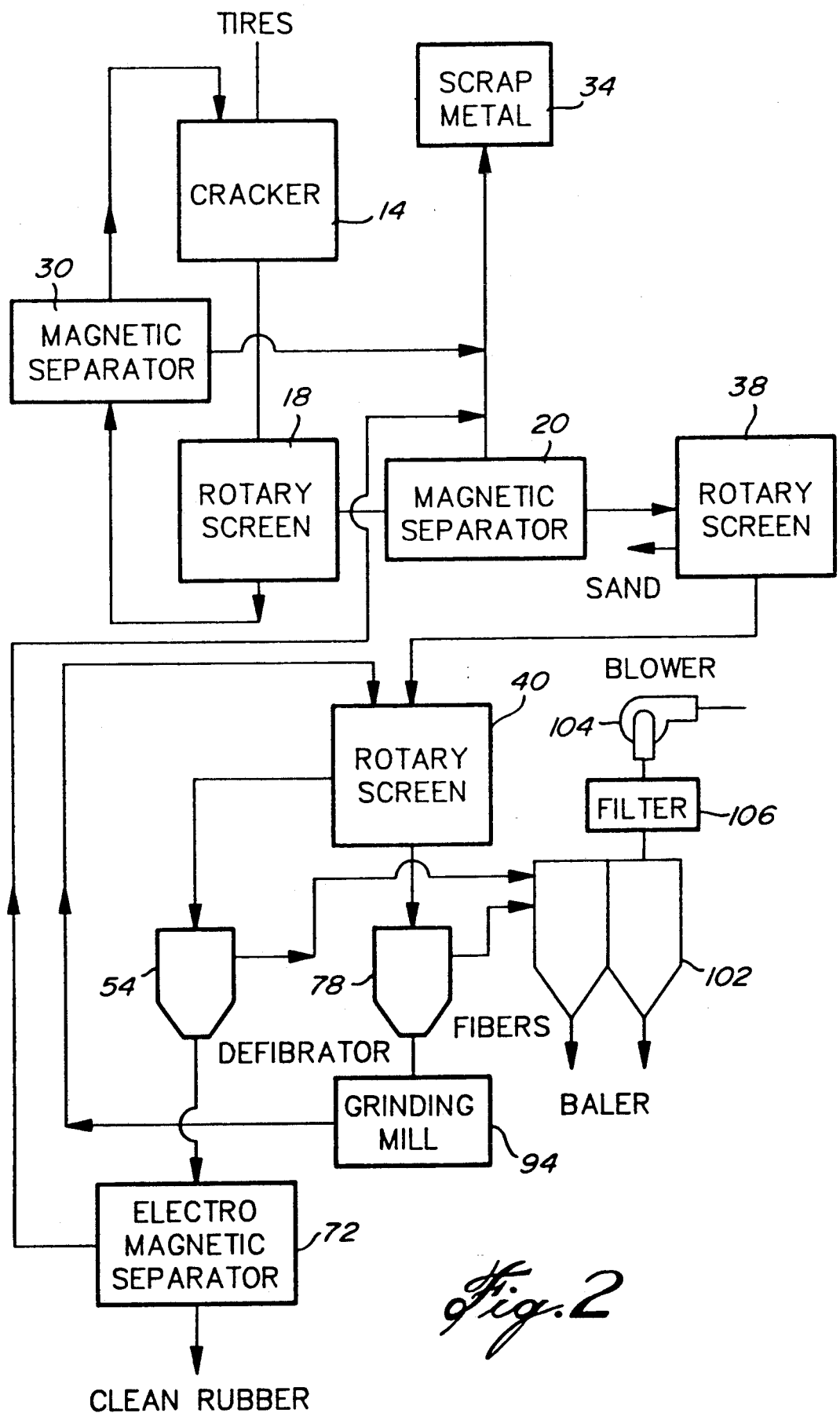
FIG. 2 is a flow sheet of the process in accordance with the present invention.

Referring to FIGS. 1a and 1b, scrap tires can be charged into a feeding chute 10, and the conveyor 12 will advance the tires to drop into the cracker 14. The cracker 14 is a comminutor of the type having two oppositely rotating rolls traveling at different speeds. Hook-type knives are provided on the surface of the rolls which shred the tires as the tires pass between the nip of the rolls rotating at different speeds. The discharge of the cracker 14 is directly onto a conveyor 16 which carries the fragments of the rubber metal bead and cord fabric into a rotating screen 18. The rotating screen of relatively large mesh allows the smaller particles to pass through to a magnetic separator 20 which can be in the form of a magnetized pulley on a short conveyor which will discharge the magnetically attracted parts, mostly pieces of metal wire, onto a conveyor 22 which will carry the metal pieces to a container 34.

The non-magnetic fraction will drop through chute 24 into a screw conveyor 40 to be engaged by a pneumatic conveyor 42 which is driven by an air pump 44. The material which is too large to pass through the screen 18 will be discharged at the end of the rotary screen 18 into a chute 26 and will be returned to the cracker by means of conveyor 28.

Referring now to FIG. 1b, a continuation of the process is illustrated. The pneumatic conveyor 42 advances the particles of rubber and cord fabric into a cylindrical drum 36 which has a first screen portion 38 of fine mesh and a second screen portion 40 of slightly larger mesh. The discharge of the conveyor 42 into the rotary screen 38 allows fine sand and debris to pass through the screen into a chute 48 to a discharge bin 50. Most of the particles of rubber and cord fabric will advance in the drum 36 to the rotary screen segment 40 of larger mesh. The screen 40, in one embodiment, has a 30 mesh screen size, allowing fine rubber particles and fabric fibers to pass through the screen into the chute 52 through the inlet 58 of a defibrator 54.

The defibrator of the present invention includes a housing 56 with a material inlet 58 on the top wall thereof and a peripheral air inlet 60 provided in a lower portion of the housing 56. A cylindrical rotor 64 is journaled centrally of the top wall 56.

The cylindrical rotor 64 is in the form of a cage with a closed bottom wall and a plurality of slightly spaced-apart blades 66 extending vertically and parallel about the periphery of the rotor. In the case of defibrator 54 which is used with fines, there would typically be 200 blades. An air outlet 62 is provided in the top wall of the housing 56 communicating with the interior of the rotor 64.

As will be described, an airstream is induced in the defibrator between the air inlet 60 and the air outlet 62. Material falling through the inlet 58 into the housing 56 will be caught up in the airstream. The rotor 64, which is driven to rotate about its axis, forms a gate in the airstream whereby airborne fabric fibers will pass between the blades and continue with the airstream through the outlet 62 while the heavier solids, such as rubber particles, will be deflected away from the airstream by means of the blades 66 in the rotor 64.

The rubber particles will thus fall to the bottom of the defibrator 54 to be discharged through an airlock 70 and pass on through a further magnetic separator 72 which, in the present embodiment, is an electromagnet. Metal particles picked up by the electromagnet 72 will be fed back to conveyor 32 to deposit these particles in the container 34.

The fine rubber particles which pass through the airlock 70 will be captured in a storage bin 74. The fine rubber particles are now relatively clean rubber as most of the fibers and metal have been separated therefrom. These rubber particles can be used in other rubber products. In a specific embodiment, the rubber particles are molded into floor mats for cow barns or stables, etc.

The rubber and fabric fibers which are too large for the screen 40 are discharged into chute 76 which directs the particles into a defibrator 78 which has a similar construction to defibrator 54. In defibrator 78 there is a housing 80 with an inlet 82 for the material and an air inlet 84. An air outlet 86 is illustrated communicating with the interior of the cylindrical rotor 88 having blades 89. In defibrator 78 which handles coarser material than defibrator 54, there is, in this embodiment, only 100 blades as compared with 200 blades in the defibrator 54.

The blades 89 act to deflect the larger rubber particles which are then discharged through an airlock 90 and conveyed by means of a pneumatic conveyor 92 to a grinder 94. The grinder 94 is built on the same principle as the cracker 14, that is, having pairs of rollers forming a nip and rotating in the same direction but at different speeds. Since the grinder 94 is handling smaller material, the speeds thereof can be higher with a speed differential of, for instance, 1 to 6. The reduced particles of rubber and fabric fibers are returned to the screen portion 40 by means of a pneumatic conveyor 96. Once again, the reduced material is more likely to pass through the screen 40, and this time be defibrated by the defibrator 54.

The air outlets of both defibrators 54 and 78 communicate with a double cyclone 102 to separate the fibers from the airstream. The airstream is created by means of a pump 104 which draws air through the inlets 60 and 84 in the respective defibrators 54 and 78. The airborne fibers are carried through tubes 98 and 100 respectively into the cyclone 102. The airstream exiting from the cyclone 102 is then passed through a filter 106 to remove smaller particles which are still airborne.

The fiber material can be discharged from the cyclone 102 for commercial use.

We claim:

1. A process for separating the economic components of scrap rubber tires, including the steps of comminuting the rubber tires in a first stage and screening the reduced portions of rubber, metal, and fabric cord through a first screening stage, magnetically separating the screened particles between a magnetic fraction and a fraction of substantially rubber and fabric fibers, conveying the rubber and fabric fiber fraction to a second screening stage having a fine mesh for separating fine particles of debris therefrom, conveying the materials to a third screening stage having a larger mesh suitable for separating rubber and fabric fines, subjecting the rubber and fabric fines which pass through the third screening stage to a pneumatic separation in a stage where the lighter fabric particles will be airborne on an airstream and pass through a gate of rotating blades while the denser rubber fines will be deflected from the airstream by said blades, wherein said resulting rubber fines are suitable for making commercial products, conveying said airborne fibers through a cyclone for separating the fibers from the air and storing the fibers, discharging the coarser rubber and fabric fiber particles from the third screening stage through a second pneumatic separator stage, providing an airstream in the second separator stage which passes through a gate made up of rotating blades to allow lighter coarse fabric fibers to pass through the gate and the blades deflect the coarse rubber particles, discharging the coarse rubber particles to a second comminuting stage and conveying the reduced rubber and fabric fibers from the second comminuting stage to the third screening stage for further separation.

2. A process as defined in claim 1, wherein the discharge from the first rotary screen which does not pass through the screen is returned to the first comminuting stage.

3. A process in accordance with claim 1, wherein the first and second comminuting stages comprise the steps of shredding the materials.

4. A process as defined in claim 1, wherein the denser rubber fines discharged from the first pneumatic separation stage are passed through a further magnetic separation stage for separating fine magnetic metal particles from the rubber fines.

5. A process as defined in claim 1, wherein the nonmetallic fraction of rubber particles and fabric cord fibers issuing from the first magnetic separation stage is pneumatically conveyed to the second screening stage, and the discharge from the second comminuting stage is pneumatically conveyed to the third screening stage.

6. A process as defined in claim 1, wherein the larger mesh of the second screening stage is substantially 30 mesh.

* * * * *